(12) United States Patent
Xu

(10) Patent No.: US 8,812,787 B2
(45) Date of Patent: Aug. 19, 2014

(54) ROUTER AND MANY-CORE SYSTEM

(75) Inventor: Hui Xu, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 617 days.

(21) Appl. No.: 13/053,115

(22) Filed: Mar. 21, 2011

(65) Prior Publication Data

US 2012/0198173 A1  Aug. 2, 2012

(30) Foreign Application Priority Data

Jan. 28, 2011  (JP) ................................. 2011-016317

(51) Int. Cl.
*G06F 12/00* (2006.01)
*G06F 13/00* (2006.01)

(52) U.S. Cl.
USPC ............ 711/133; 711/100; 711/118; 711/154

(58) Field of Classification Search
CPC .............................. G06F 12/12; G06F 12/121
USPC .......................... 711/100, 117–118, 133, 154
See application file for complete search history.

(56) References Cited

U.S. PATENT DOCUMENTS

| 6,850,999 B1 * | 2/2005 | Mak et al. ........................ 710/39 |
| 2005/0240745 A1 * | 10/2005 | Iyer et al. ...................... 711/167 |
| 2008/0123679 A1 | 5/2008 | Scott et al. | |

FOREIGN PATENT DOCUMENTS

WO  WO 2006-12284  2/2006

OTHER PUBLICATIONS

Explanation of References.

* cited by examiner

*Primary Examiner* — Tuan Thai
(74) *Attorney, Agent, or Firm* — Knobbe, Martens, Olson & Bear, LLP

(57) ABSTRACT

According to one embodiment, a router manages routing of a packet transferred between a plurality of cores and at least one of cache memories to which the cores can access. The router includes an analyzer, a packet memory and a controller. The analyzer determines whether the packet is a read-packet or a write-packet. The packet memory stores at least part of the write-packet issued by one of the cores. The controller stores cache data of the write-packet and a cache address in the packet memory when the analyzer determines that the packet is the write-packet. The cache address indicates an address in which the cache data is stored. The controller outputs the cache data stored in the packet memory to the core issuing a read-request as a response data corresponding to the read packet when the analyzer determines that the packet is the read-packet and the cache address corresponding to the read-request is stored in the packet memory.

20 Claims, 15 Drawing Sheets

ROUTER AND MANY-CORE SYSTEM

CROSS REFERENCE TO RELATED APPLICATIONS

This application is based upon and claims the benefit of priority from the prior Japanese Patent Application No. 2011-016317, filed on Jan. 28, 2011, the entire contents of which are incorporated herein by reference.

FIELD

Embodiments described herein relate generally to a router and a many-core system.

BACKGROUND

Generally, in a many-core system, plural cores, plural routers, and shared memories are connected through a network. In such many-core systems, a read-request and a write-request which are issued by the core are outputted to the shared memory through the network. Generally, because the read-request is smaller than the write-request in a transfer amount, an arrival time of the read-request is shorter than an operation time of the write-request.

However, in a conventional many-core system, in order to ensure the access order, for simple (usually) when the read-request is issued after the write-request is issued, the operation of the read-request is not started until the operation of the write-request is ended, thereby read access latency that means a time until a read-response reaches the core since the read-request was issued is lengthened. As a result, not only performance of the core, but also performance of the whole many-core system is degraded.

On the other hand, there is a method for outputting the read-request which is issued after the write-request is issued prior to the write-request by using a buffer in which the write-request is tentatively stored in the core. However, by this method, possibly, the operation of the read-request performed after the operation of the write-request outputted from the buffer is performed prior to the operation of the write-request. So the read request which is different from the write address can be issued first, instead it can be read out of the buffer. However, when the write buffer is overflowed, the issuance order and the operation order of the requests maybe replaced in the network transfer. Therefore, it is necessary to provide a further function of solving a trouble caused by replacing the issuance order and the operation order of the requests in a router or the shared memories, which results in a problem in that a structure of the router or shared memories become complicated.

DETAILED DESCRIPTION

Embodiments will now be explained with reference to the accompanying drawings.

In general, according to one embodiment, a router manages routing of a packet transferred between a plurality of cores and at least one of cache memories to which the cores can access. The router includes an analyzer, a packet memory and a controller. The analyzer determines whether the packet is a read-packet or a write-packet. The packet memory stores at least part of the write-packet issued by one of the cores. The controller stores cache data of the write-packet and a cache address in the packet memory when the analyzer determines that the packet is the write-packet. The cache address indicates an address in which the cache data is stored. The controller outputs the cache data stored in the packet memory to the core issuing a read-request as a response data corresponding to the read packet when the analyzer determines that the packet is the read-packet and the cache address corresponding to the read-request is stored in the packet memory.

(First Embodiment)

Figure 1:
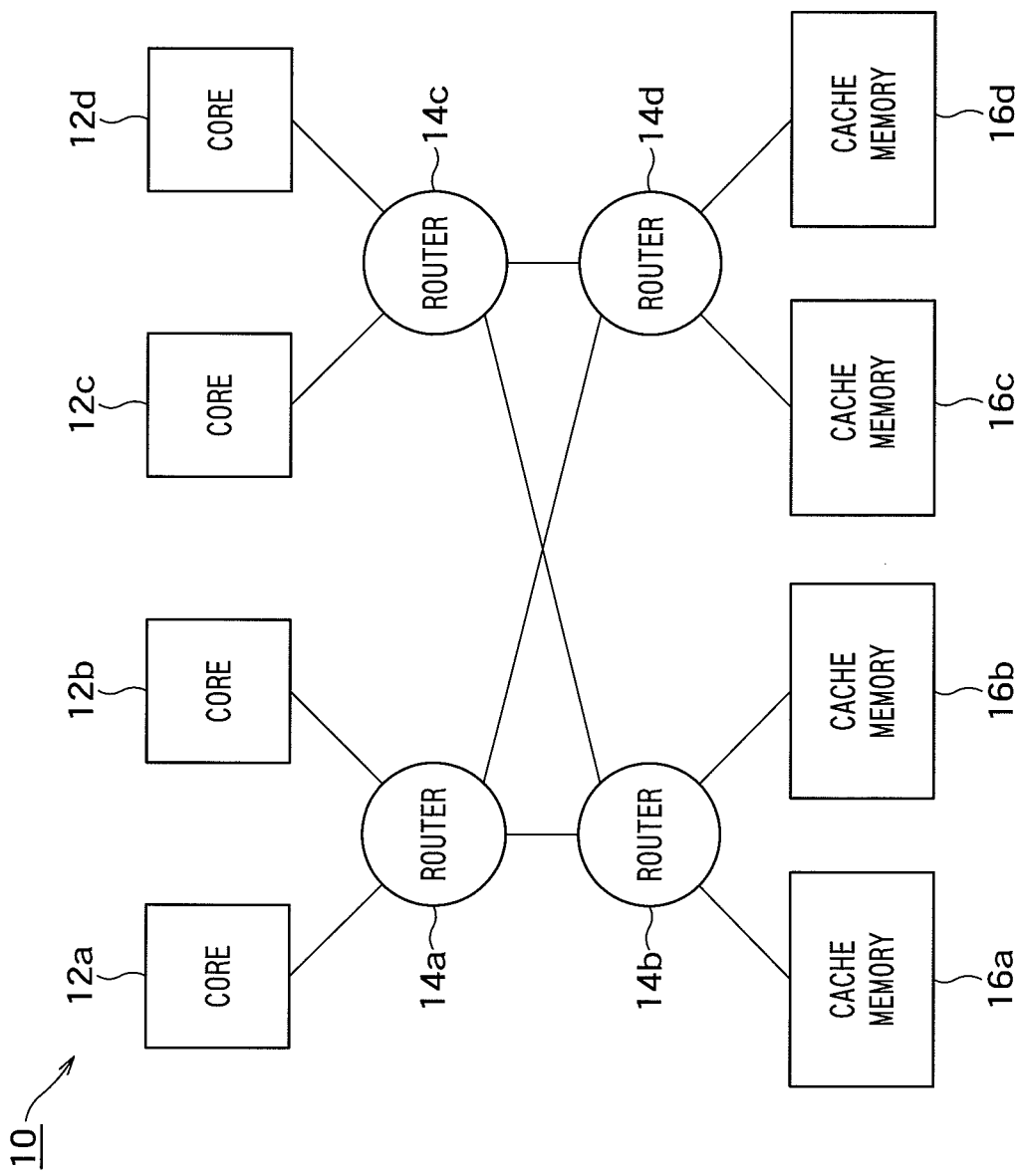
FIG. 1 is a block diagram illustrating a network topology of a many-core system 10 of the embodiment.

A configuration of a many-core system of an embodiment will be explained below. FIG. 1 is a block diagram illustrating a network topology of a many-core system 10 of the embodiment. The many-core system 10 includes plural cores 12a to 12d, plural routers 14a to 14d, and plural cache memories 16a to 16d.

Each of the cores 12a to 12d issues a read-packet including a read-request and a write-packet including a write-request to each of the cache memories 16a to 16d, and performs predetermined operation on response data included in a response packet corresponding to the read-request. Each of the routers 14a to 14d manages routing of the packet transferred between each of the cores 12a to 12d and each of the cache memories 16a to 16d. Hereinafter, sometimes each of the routers 14a to 14d is referred to as a "router 14", each of the cores 12a to 12d is referred to as a "core 12", and each of the cache memories 16a to 16d is referred to as a "cache memory 16".

In the embodiment, the numbers of cores 12, routers 14, and cache memories 16 are not limited to 4. In the embodiment, the network topology of the many-core system is not limited to the network topology of FIG. 1.

Figure 2:
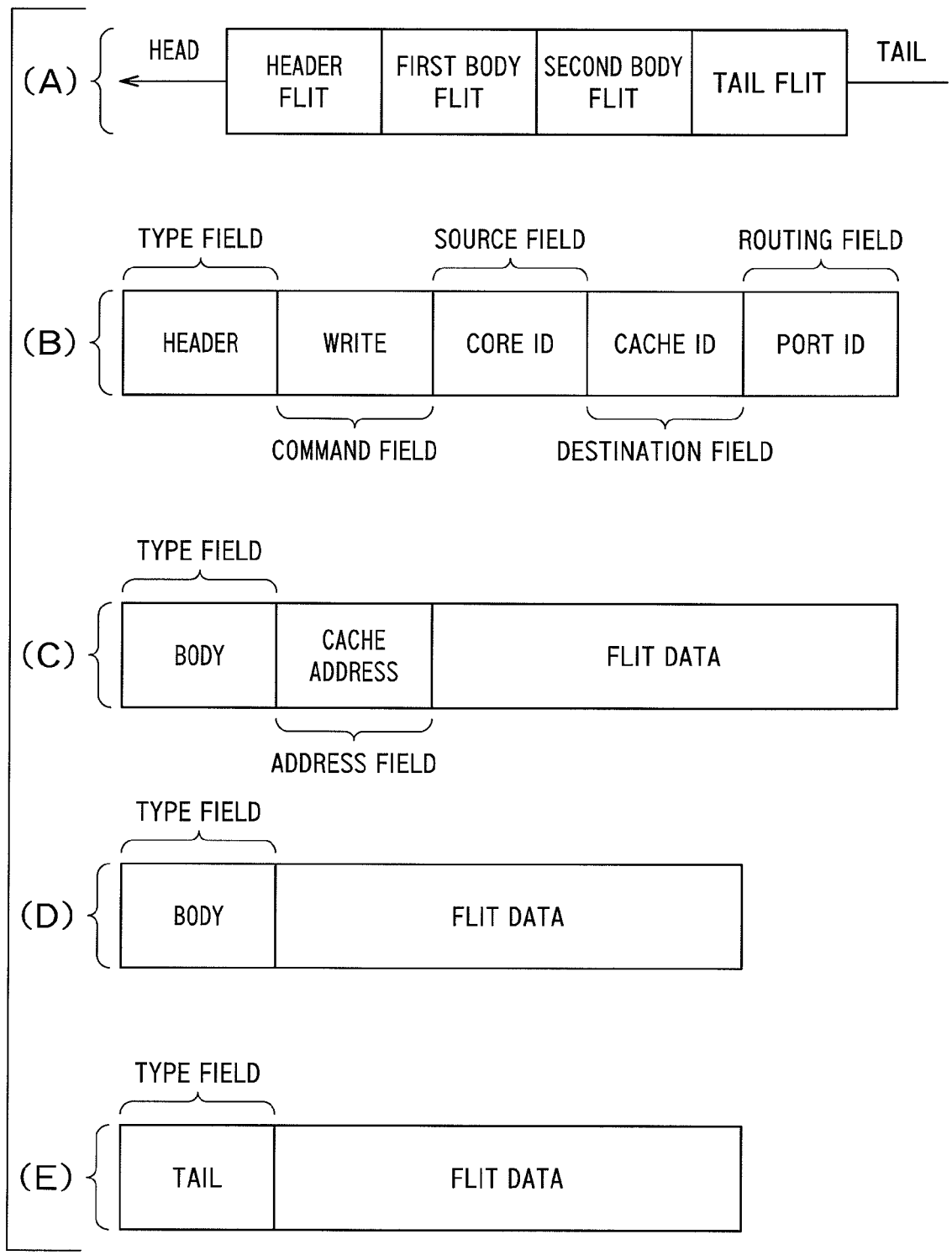
FIG. 2 is a schematic diagram illustrating a structure of the write-packet dealt with in the many-core system of the embodiment.

FIG. 2 is a schematic diagram illustrating a structure of the write-packet dealt with in the many-core system of the embodiment. The write-packet includes a header flit, a first body flit, a second body flit, and a tail flit (see (A) in FIG. 2).

The header flit is located at a head of the write-packet. The header flit includes a type field, a command field, a source field, a destination field, and a routing field (see (B) in FIG. 2). Type information "HEADER" indicating that a flit type is the header flit is set to the type field. Command information "WRITE" indicating that a packet type is the write-packet is set to the command field. Unique information (hereinafter referred to as "core ID (Identification)") of the core 12 that issues the write-packet is set to the source field. Unique information (hereinafter referred to as "cache ID") of the cache memory 16 that is a destination of the write-packet is set to the destination field. A list of pieces of unique information (hereinafter referred to as "port ID") of an input port and an output port of the router 14, which are uniquely determined by the core ID set to the source field and the cache ID set to the destination field, is set to the routing field. The routing field is a variable length field.

The first body flit follows the header flit. The first body flit includes a type field, an address field, and flit data (see (C) in FIG. 2). Type information "BODY" indicating that the flit type is the body flit is set to the type field. A cache address of the cache memory 16 in which cache data is stored is set to the address field. In the flit data, the cache data is divided by the total number of first body flits, second body flits, and tail flits. For example, assuming that 1 cache line size has 256 bytes and the total number of first body flits, second body flits, and tail flits are 4, the flit data has 64 bytes.

The second body flit follows the first body flit. The tail flit is located at a tail of the write-packet. Each of the second body flit and the tail flit includes a type field and a flit data (see (D) and (E) in FIG. 2). Type information "BODY" indicating that the flit type is the body flit is set to the type field of the second body flit. Type information "TAIL" indicating that the flit type is the tail flit is set to the type field of the tail flit. The flit data is similar to that of the first body flit.

Figure 3:
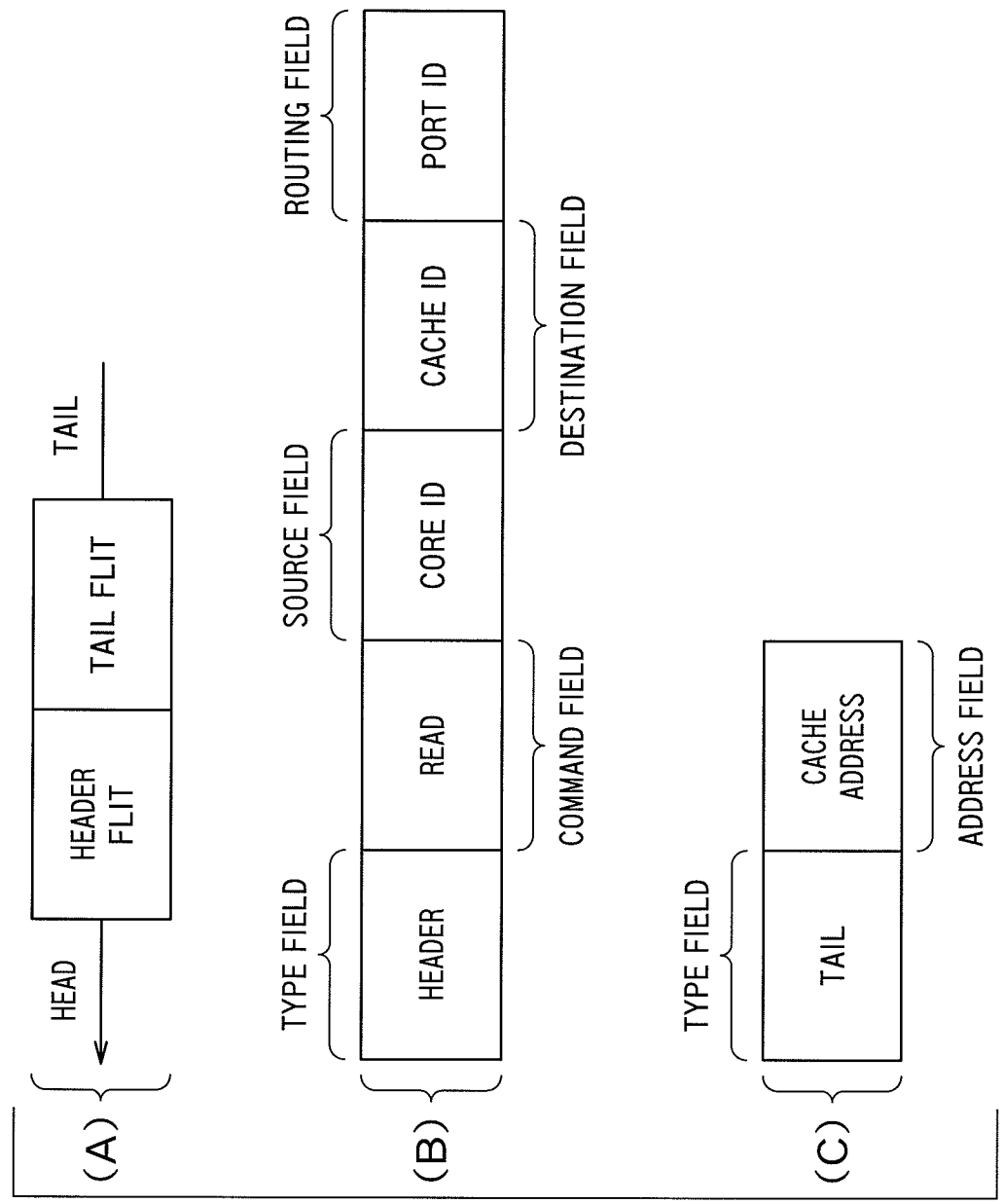
FIG. 3 is a schematic diagram illustrating a structure of the read-packet dealt with in the many-core system of the embodiment.

FIG. 3 is a schematic diagram illustrating a structure of the read-packet dealt with in the many-core system of the embodiment. The read-packet includes the header flit and the tail flit (see (A) in FIG. 3).

The header flit is located at the head of the read-packet. The header flit includes the type field, the command field, the source field, the destination field, and the routing field (see (B) in FIG. 3). The type information "HEADER" indicating that the flit type is the header flit is set to the type field. Command information "READ" indicating that the packet type is the read-packet is set to the command field. The core ID of the core 12 that issues the read-packet is set to the source field. The cache ID of the cache memory 16 that is an output destination of the read-packet is set to the destination field. A list of the port IDs is set to the routing field. The routing field is a variable length field.

The tail flit is located at the tail of the read-packet. The tail flit includes the type field and the address field (see (C) in FIG. 3). The type information "TAIL" indicating that the flit type is the tail flit is set to the type field. The cache address in which the cache data to be read from the cache memory 16 is stored is set to the address field. The read-packet does not include the flit data unlike the write-packet. That is, a data amount of the read-packet is smaller than that of the write-packet.

Figure 4:
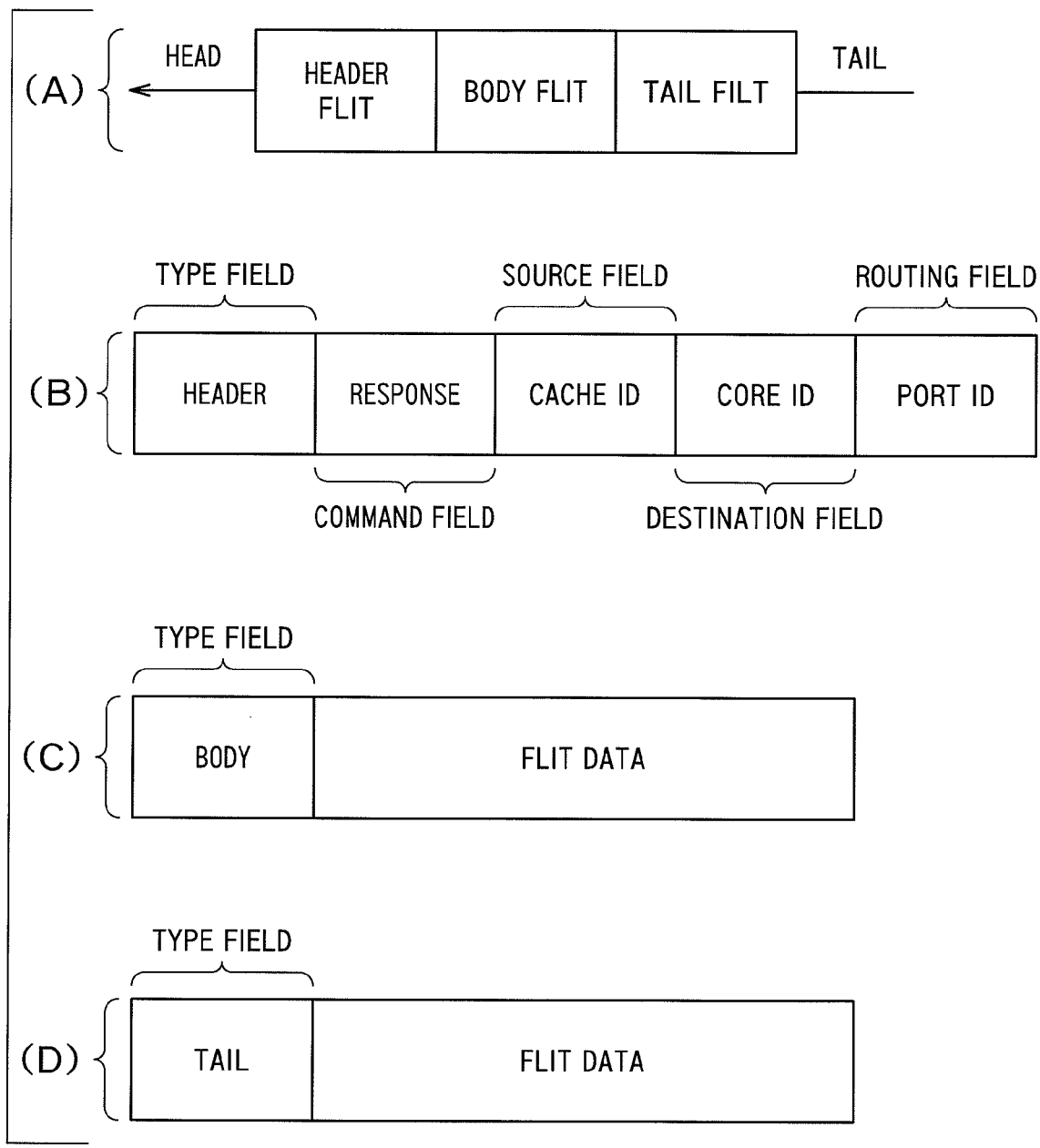
FIG. 4 is a schematic diagram illustrating a structure of the response packet dealt with in the many-core system of the embodiment.

FIG. 4 is a schematic diagram illustrating a structure of the response packet dealt with in the many-core system of the embodiment. The response packet includes the header flit, the body flit, and the tail flit (see (A) in FIG. 4).

The header flit is located at the head of the response packet. The header flit includes the type field, the command field, the source field, the destination field, and the routing field (see (B) in FIG. 4). The type information "HEADER" indicating that the flit type is the header flit is set to the type field. Command information "RESPONSE" indicating that the packet type is the response packet is set to the command field. The cache ID or router ID to which should respond is set to the source field. The core ID of the core 12 that is the destination of the response packet is set to the destination field. A list of the port IDs, which are uniquely determined by the cache ID or router ID set to the source field and the core ID set to the destination field, is set to the routing field. The routing field is a variable length field.

The body flit follows the header flit. The tail flit is located at the tail. Each of the body flit and the tail flit includes the type field and the flit data (see (C) and (D) in FIG. 4). The type information "BODY" indicating that the flit type is the body flit is set to the type field of the body flit. The type information "TAIL" indicating that the flit type is the tail flit is set to the type field of the tail flit. The flit data is similar to that of the write-packet.

Figure 5:
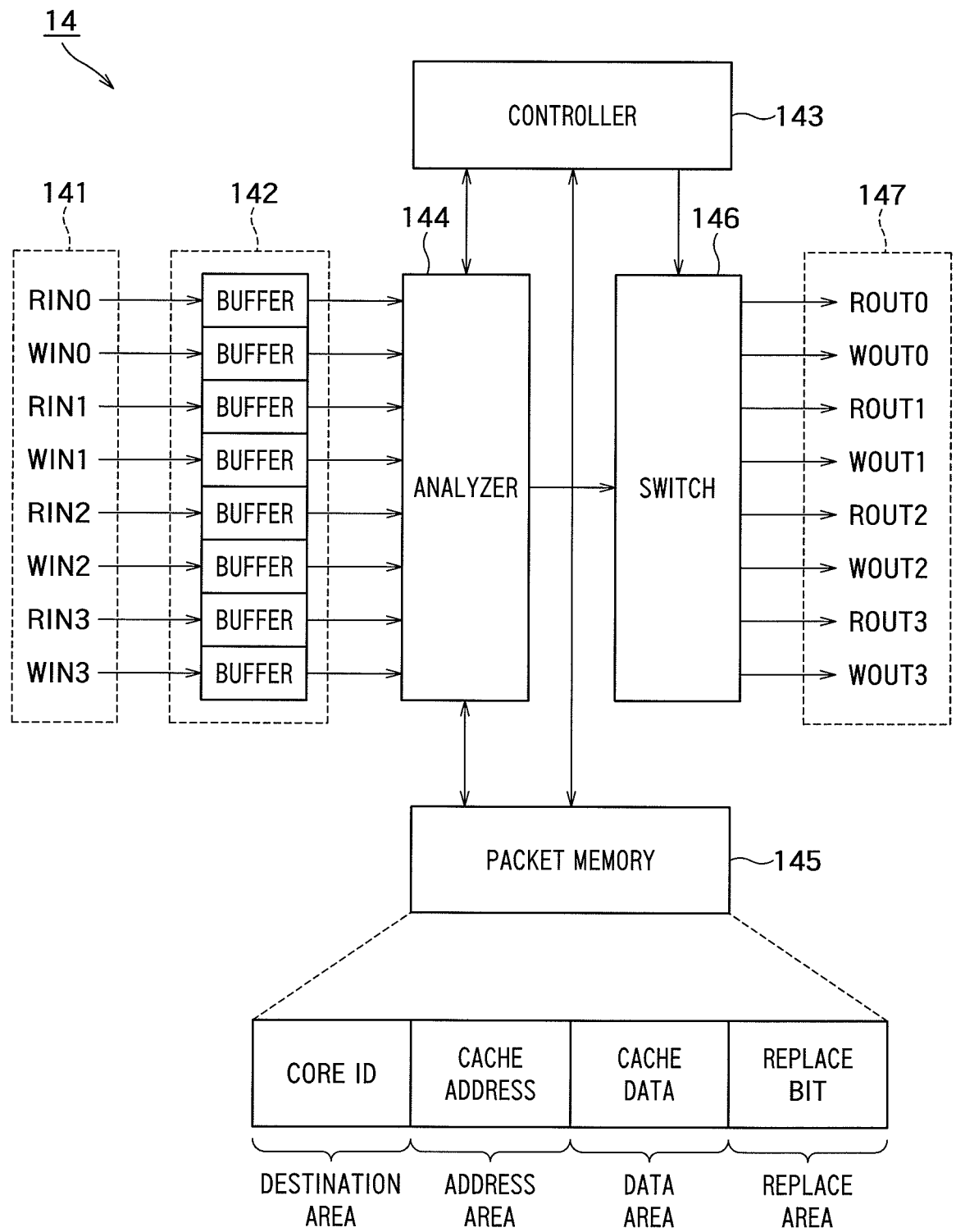
FIG. 5 is a block diagram illustrating a configuration of the router 14 of the embodiment.

FIG. 5 is a block diagram illustrating a configuration of the router 14 of the embodiment. The router 14 includes plural input ports 141, plural buffers 142, a controller 143, an analyzer 144, a packet memory 145, a switch 146, and plural output ports 147.

Each input port 141 includes read-input ports RIN0 to RIN3 and write-input ports WIN0 to WIN3. Each output port 147 includes read-output ports ROUT0 to ROUT3 and write-output ports WOUT0 to WOUT3. That is, in the router 14, a read channel and a write channel are physically separated. Therefore, the read-request and the write-request can concurrently be operated. The numbers of input ports 141 and output ports 147 depend on the number of connected modules (such as the core, the cache memory, and the router). Each buffer 142 is provided according to each input port 141. The packet inputted to each input port 141 is tentatively stored in the buffer 142.

The controller 143 controls the analyzer 144, the packet memory 145, and the switch 146. The analyzer 144 analyzes the packet. The switch 146 selects the output port connected to the destination of the packet.

At least part of the write-packet issued by the core 12 can be stored in the packet memory 145. The packet memory 145 includes a destination area, an address area, a data area, and a replace area. The core ID set to the source field of the header flit is stored in the destination area. The cache address set to the address field of the first body flit is stored in the address area. All the pieces of flit data (that is, cache data) included in the write-packet are stored in the data area. A replace bit (for example, 2 bits) indicating whether the write-packet can be read and deleted or not is set to the replace area.

Figure 6:
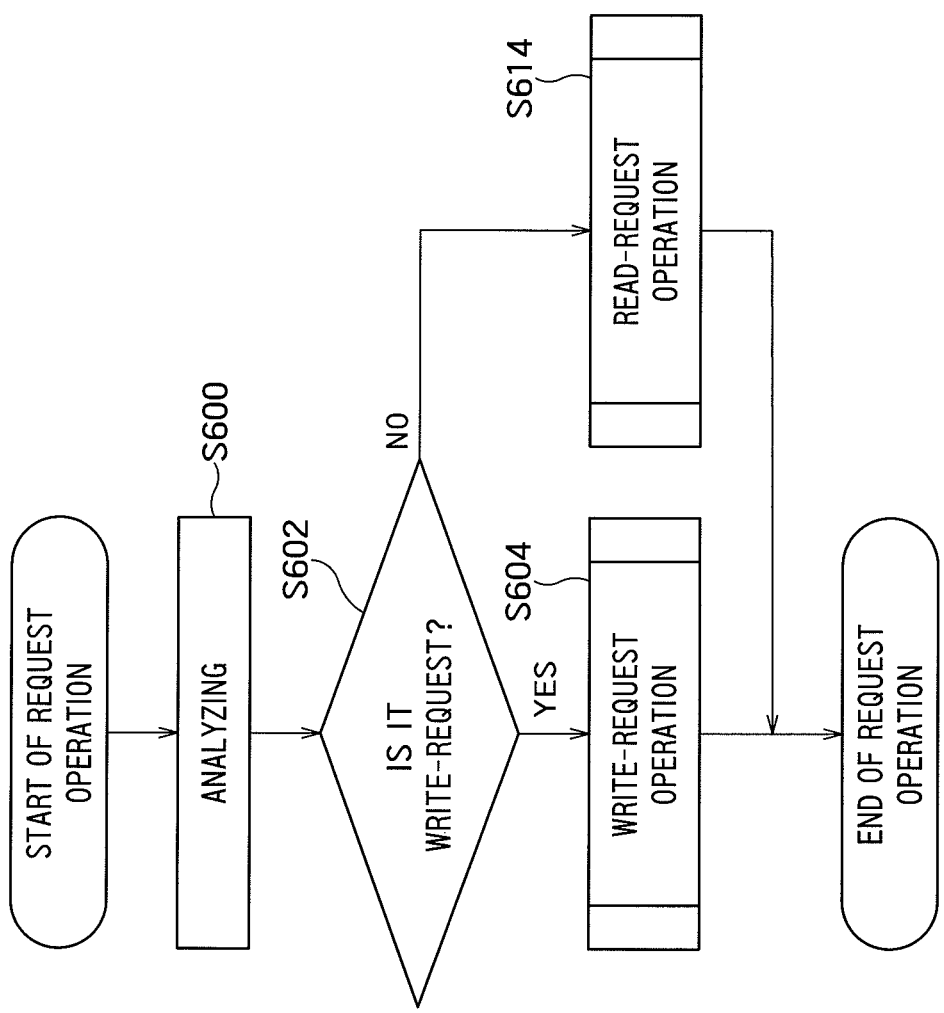
FIG. 6 is a flowchart of request operation of the embodiment.

A behavior of the many-core system of the embodiment will be explained below. FIG. 6 is a flowchart of request operation of the embodiment. For example, the replace bit is set to "2" when there is no write-packet which is permitted to delete, the replace bit is set to "0" when the write-packet are prohibited to be read and deleted, and the replace bit is set to "1" when the write-packet is permitted to be read and prohibited to be deleted.

<S600 to S614> The analyzer 144 analyzes the header flit of the inputted request packet (S600). When the command information "WRITE" is set (YES in S602), the flow goes to a write-request operation (S604). When the command information "READ" is set (NO in S602), the flow goes to a read-request operation (S614).

Figure 7:
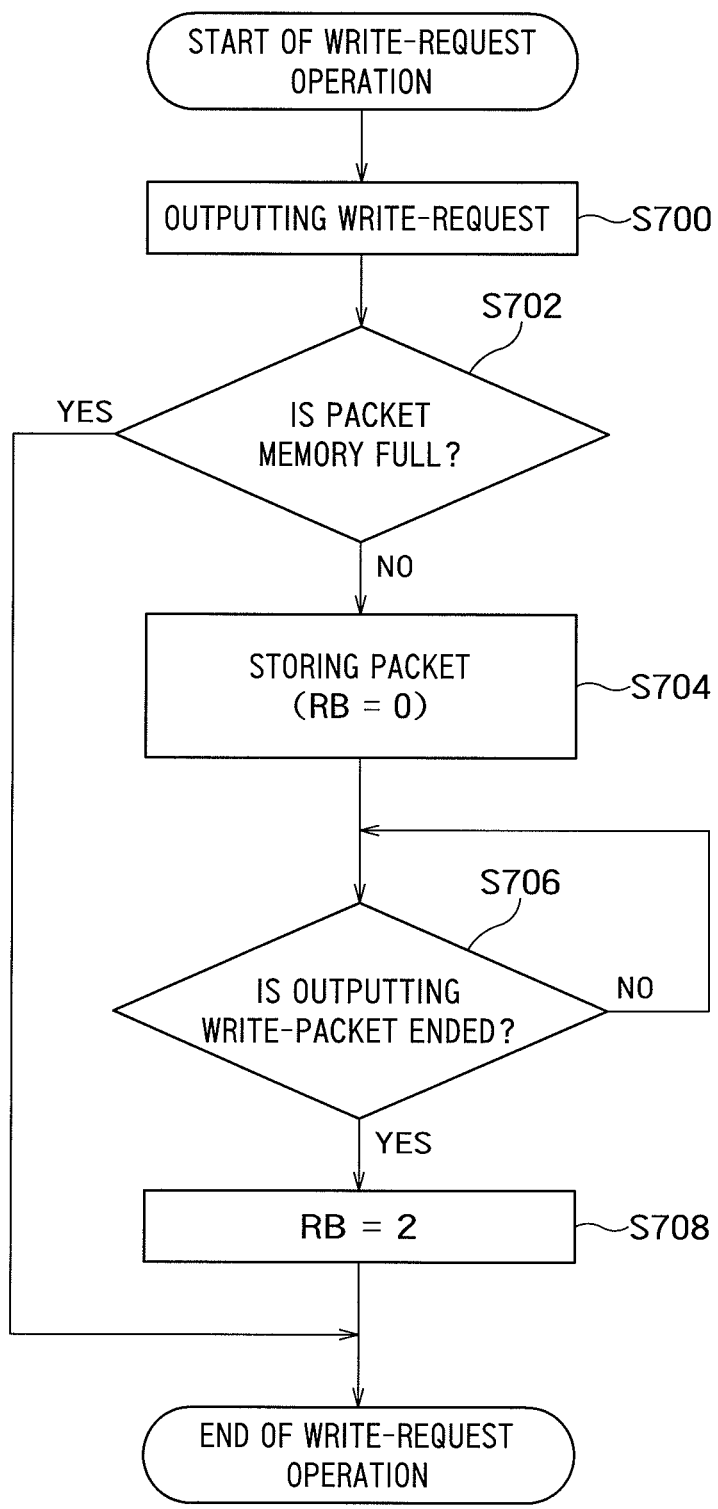
FIG. 7 is a flowchart of the write-request operation of the embodiment.

First the write-request operation of the embodiment will be explained. FIG. 7 is a flowchart of the write-request operation of the embodiment. The write-request operation is performed by each router 14. The case in which the core 12a issues the write-request to the cache memory 16a will be explained below as an example of the write-request operation.

<S700> The controller 143 controls the switch 146 based on the analysis result of the analyzer 144. The switch 146 selects the port connected to the destination of the write-request from the write-output ports WOUT0 to WOUT3 (S700). For example, when the analyzer 144 analyzes the port ID, the controller 143 controls the switch 146 such that the switch 146 selects the port corresponding to the port ID.

<S702> The controller 143 determines whether the packet memory 145 is full or not (S702). For example, when there are not an empty space in the packet memory 145 and the replace area to which the replace bit "2" is set, the controller 143 determines that the packet memory 145 is full. When the packet memory 145 is full (YES in S702), the write-packet is not stored in the packet memory 145, but the write-packet is outputted to the subsequent router or cache memory. When the packet memory 145 is not full (NO in S702), the flow goes to S704.

<S704> The controller 143 transfers the write-packet stored in the buffer 142 to the packet memory 145 (S704). At this point, the controller 143 sets the replace bit "0" to the packet memory 145.

<S706 and S708> The controller 143 determines whether outputting write-packet is ended or not (S706). For example, the controller 143 of the router 14a determines that outputting write-packet is ended, when the write-packet is outputted from the write-output port WOUT in S700 (that is, when the write-packet is transferred to the router 14b). The controller 143 of the router 14b determines that outputting write-packet is ended, when the write-packet is outputted from the write-output port WOUT in S700 (that is, when the write-packet is stored in the cache memory 16a). When the write-packet is stored, the cache memory 16a outputs a reception signal indicating that the write-packet is received to the router 14a through the router 14b. When outputting write-packet is ended (YES in S706), the controller 143 sets the replace bit "2" to the replace area to permit the write-packet to be read and deleted (S708).

For example, when the packet memory 145 of the router 14a is full (YES in S702), the write-packet is outputted to the router 14b. When there is the empty space in the packet memory 145 of the router 14b, the write-packet is stored in the packet memory 145 of the router 14b. On the other hand, when the packet memory 145 of the router 14b is full (YES in S702), the write-packet is stored in the cache memory 16a. Therefore, it is guaranteed that a first write-packet which reaches the router 14a in first is stored in the packet memory 145 of the router 14b or the cache memory 16a. Further, it is guaranteed that the issuance order and operation order of a second write-packet which is issued after the first write-packet and the first write-packet are identical to each other.

Figure 8:
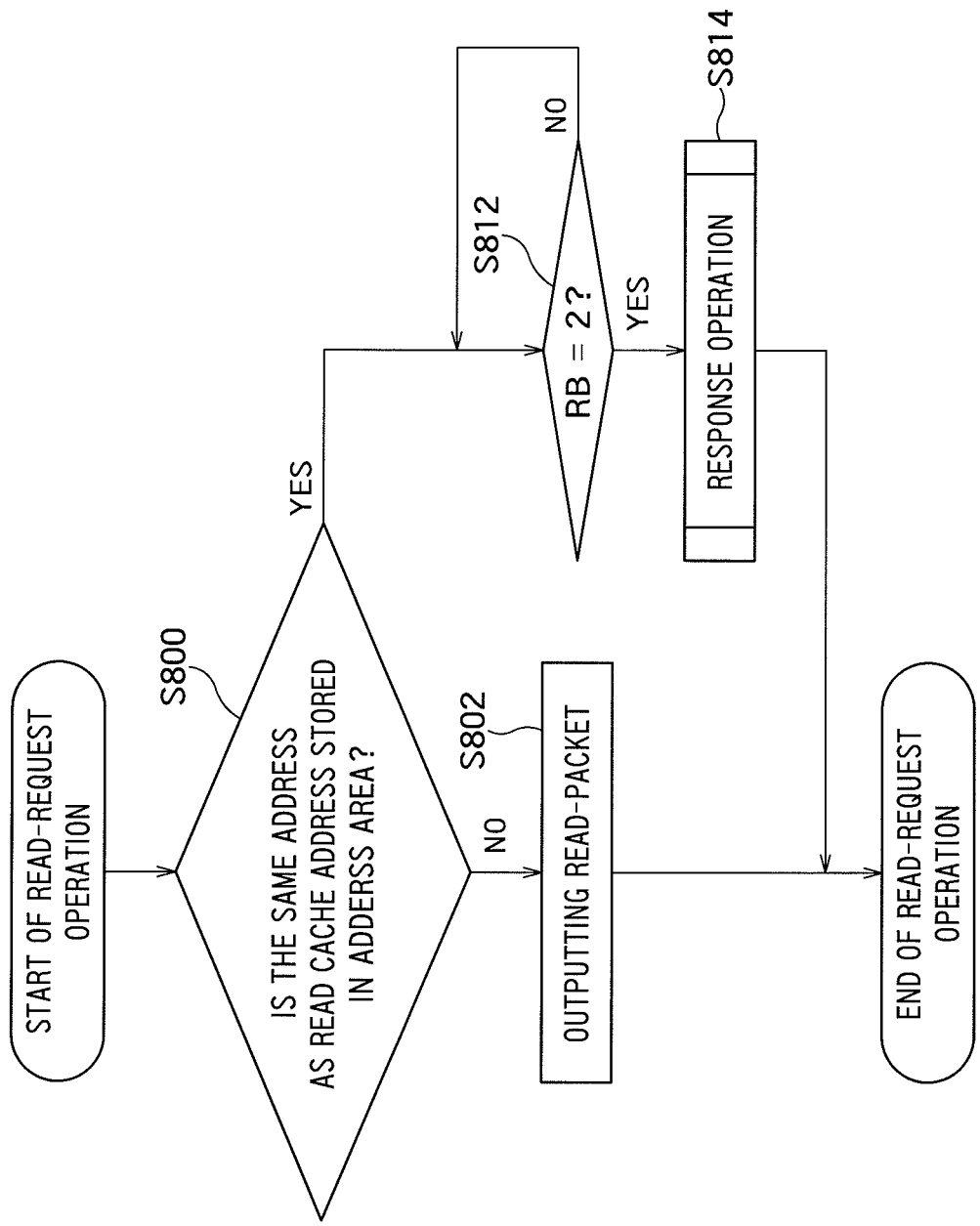
FIG. 8 is a flowchart of the read-request operation of the embodiment.

Then the read-request operation of the embodiment will be explained. FIG. 8 is a flowchart of the read-request operation of the embodiment. The read-request operation is performed by the routers 14a to 14d in parallel with the write-request operation.

<S800> The controller 143 determines whether the same address as a read cache address set in the read-packet is stored in the address area of the packet memory 145 or not (S800). When such cache address is not stored (NO in S800), the flow goes to S802. When such cache address is stored (YES in S800), the flow goes to S812.

<S802> The controller 143 controls the switch 146 based on the analysis result of the analyzer 144. The switch 146 selects the port connected to the destination of the read-packet from the read-output ports ROUT0 to ROUT3 (S802). That is, when the cache address is not stored in the packet memory 145, the controller 143 outputs the read-packet to the cache memory corresponding to the read cache address. For example, when the analyzer 144 analyzes the port ID, the controller 143 controls the switch 146 such that the switch 146 selects the port corresponding to the port ID.

Figure 9:
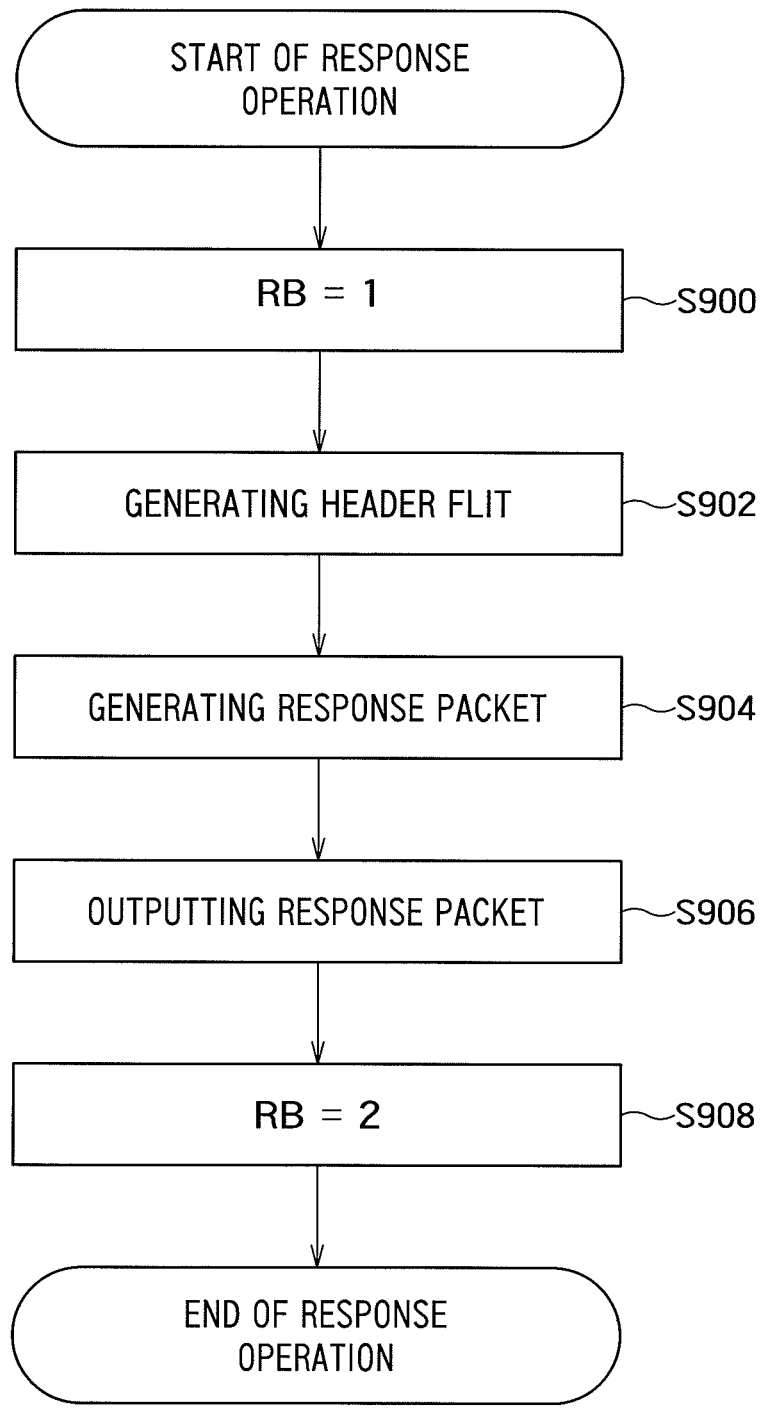
FIG. 9 is a flowchart of the response operation of the embodiment.

<S812 and S814> The controller 143 determines whether the replace bit "2" is set to the replace area of the packet memory 145 or not (S812). When the replace bit "2" is not set (NO in S812), the controller 143 waits until the replace bit "2" is set. When the replace bit "2" is set (YES in S812), the controller 143 performs a response operation (S814) to output the response packet. Instead of waiting until the replace bit "2" is set, the controller 143 may perform the response operation (S814) using the cache data stored in the packet memory 145 of the subsequent router, when the read cache address is set to the packet memory 145 of the subsequent router. FIG. 9 is a flowchart of the response operation of the embodiment.

<S900 and S902> The controller 143 sets the replace bit "1" to the packet memory 145 (S900). The controller 143 generates the header flit of the response packet using data stored in the packet memory 145 (S902). For example, the controller 143 sets the type information "HEADER" to the type field, sets the command information "RESPONSE" to the command field, sets the router ID of the router 14 to the source field, and sets the core ID stored in the destination area of the packet memory 145 to the destination field. The controller 143 also sets the list of the port IDs on the route, uniquely determined by the router ID and the core ID, to the routing field.

<S904> The controller 143 generates the response packet using the data stored in the packet memory 145 (S904). For example, the controller 143 divides the cache data of the packet memory 145 into the plural pieces of flit data and stores each piece of flit data in the body flit or the tail flit. Then the controller 143 sets the type information "BODY" to the body flit, sets the type information "TAIL" to the tail flit, and arrays the header flit, the body flit, and the tail flit in the predetermined order to generate the response packet.

<S906> The controller 143 controls the switch 146 based on the header flit of the response packet of the analyzer 144. The switch 146 selects the port connected to the destination of the response packet from the plural output ports 147 (S906).

<S908> After the response packet is outputted, the controller 143 sets the replace bit "2" to the packet memory 145 in which the write-packet is stored. As a result, another write-packet stored in the buffer 142 can be stored in the packet memory 145.

Figure 10:
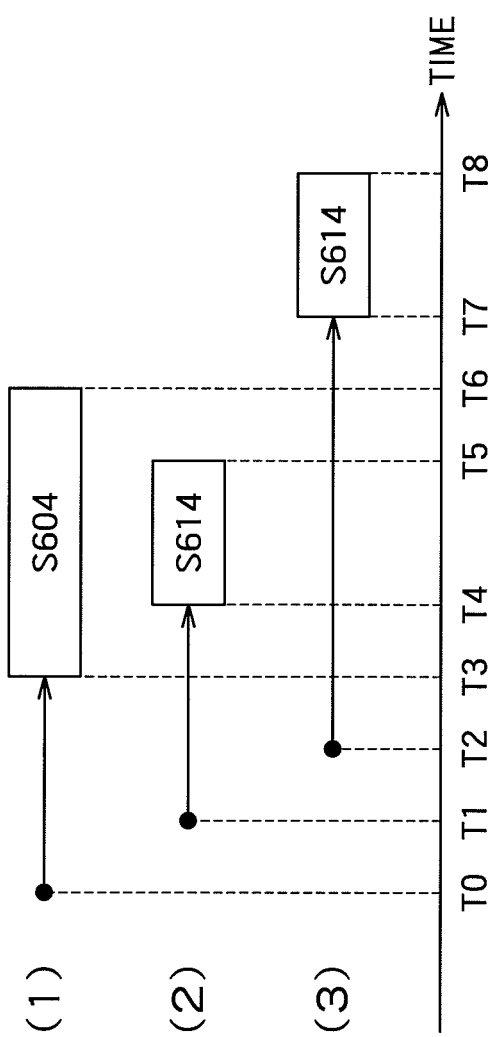
FIG. 10 illustrates a time line in the behavior example of the many-core system of the embodiment.
Figure 11:
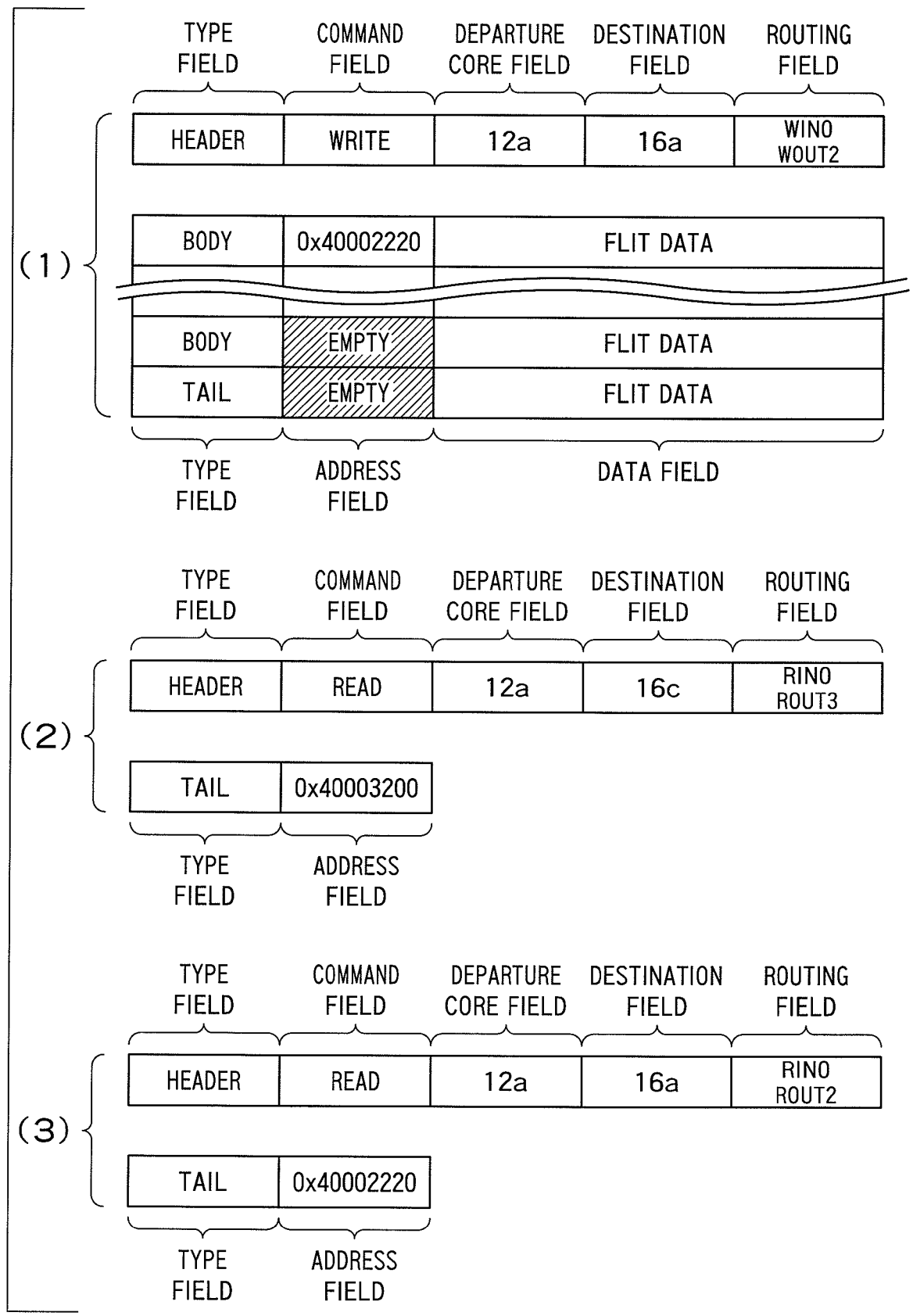
FIG. 11 is a schematic diagram illustrating the write-packet of the write-request (1) and the read-packets of the read-requests (2) and (3) in the behavior example of the many-core system of the embodiment.
Figure 12:
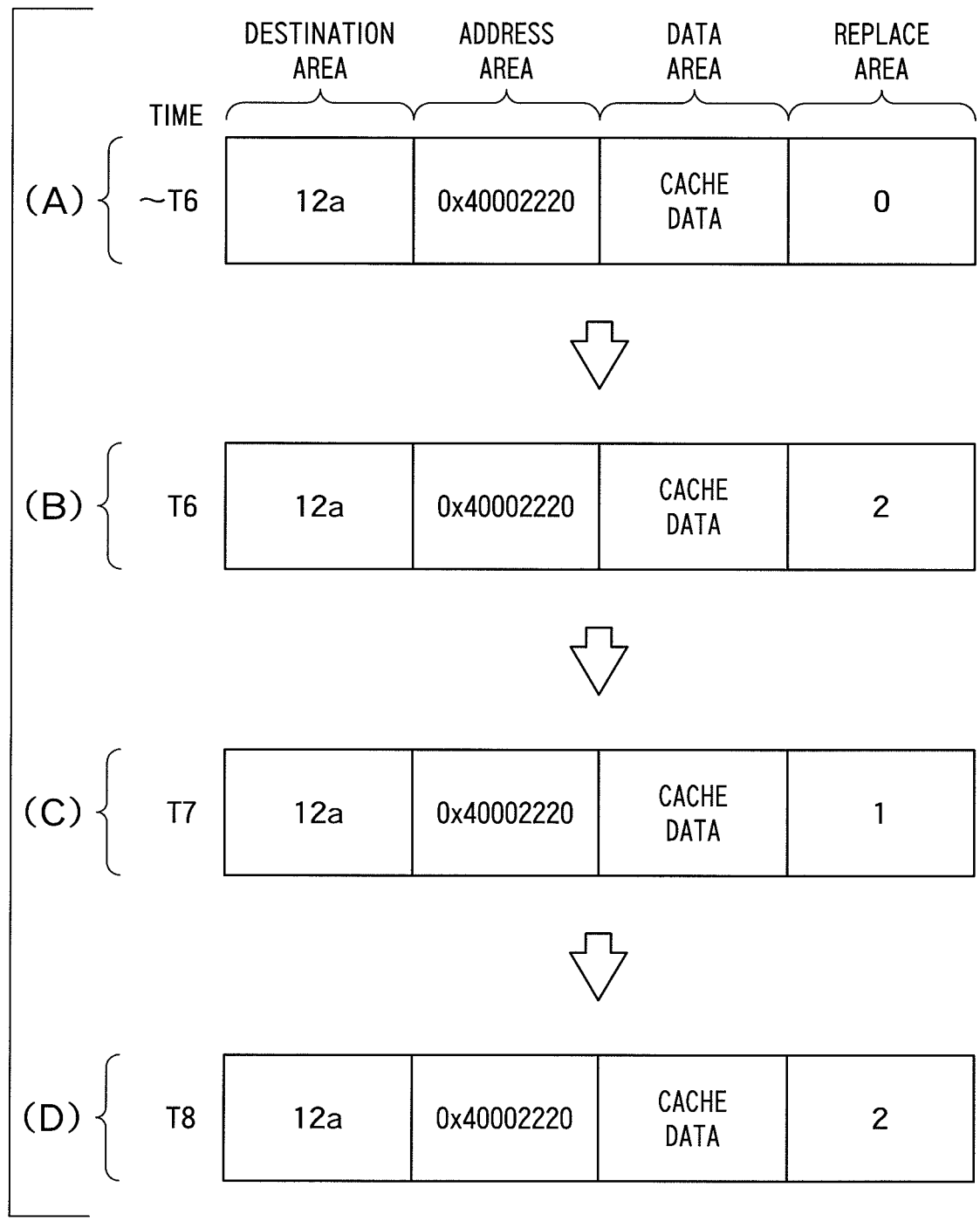
FIG. 12 is a schematic diagram illustrating data stored in the packet memory 145 in the behavior example of the many-core system of the embodiment.

A behavior example of the many-core system of the embodiment will be explained below. FIG. 10 illustrates a time line in the behavior example of the many-core system of the embodiment. FIG. 11 is a schematic diagram illustrating the write-packet of the write-request (1) and the read-packets of the read-requests (2) and (3) in the behavior example of the many-core system of the embodiment. FIG. 12 is a schematic diagram illustrating data stored in the packet memory 145 in the behavior example of the many-core system of the embodiment.

It is assumed that the core 12a issues the write-request (1) at a time T0, issues the read-request (2) at a time T1, and issues the read-request (3) at a time T2. The write-request (1) is a request to write the cache data in a cache address "0x40002220" of the cache memory 16a. The read-request (2) is a request to read the cache data stored in a cache address "0x40003200" of the cache memory 16c. The read-request (3) is a request to read the cache data (that is, the cache data to be stored in the cache memory 16a in response to the write-request (1)) stored in the cache address "0x40002220" of the cache memory 16a.

The router 14a performs the operation of the write-request (1) (S604) from a time T3. The write-packet is stored in the packet memory 145. However, because transfer of the write-packet into another router 14 and the cache memory 16a does not finish (in fact, a part of the packet have been reached the other router) until a time T6, the replace bit "0" is set to the packet memory 145 (see (A) in FIG. 12). At the time T6, the write-packet is stored in at least one of another router 14 and the cache memory 16a, the replace bit "2" is set to the packet memory 145 of the router 14a (see (B) in FIG. 12).

On the other hand, the router 14a performs the operation of the read-request (2) (S614) from a time T4. The read-packet is outputted to the cache memory 16c through the router 14d. As a result, the cache data stored in the cache address "0x40003200" of the cache memory 16c is transferred as the response data to the core 12a. The operation of the read-request (2) is ended at a time T5 before the operation of the write-request (1) is ended.

The router 14a performs the operation of the read-request (3) (S614) from a time T7. The cache data written in the cache address "0x40002220" of the cache memory 16a is stored in the packet memory 145 of the router 14a by the write-request (1). That is, the response data corresponding to the read-request (3) is stored in the packet memory 145 (see (B) in FIG. 12). Accordingly, the router 14a performs the response operation (S814) to the read-request (3). At the time T7, the replace bit "1" is set to the packet memory 145 (see (C) in FIG. 12). Then the router 14a outputs the response packet which is generated using the data of the packet memory 145 to the core 12a. After the response packet is outputted, the replace bit "2" is set to the packet memory 145 at a time T8 (see (D) in FIG. 12).

According to the embodiment, the controller 143 determines whether the packet is the read-packet or the write-packet based on the analysis result of the analyzer 144. When the packet is the write-packet and the cache address in which the cache data to be read is stored is stored in the packet memory 145, the controller 143 transfers the cache data stored in the packet memory 145 to the core (for example, the core 12a) which has issued the read request as the response data. Therefore, the read-response to the read-request is supplied to the core 12 without the cache access while the issuance order of the write-request and read-request is guaranteed. Accordingly, it is not necessary to provide the further function of solving the trouble caused by replacing the issuance order and operation order of the write-request and read-request in the router 14 or the shared memory 16. As a result, the read access latency can be reduced without complicating the structure of the router 14 or shared memory 16.

Figure 13:
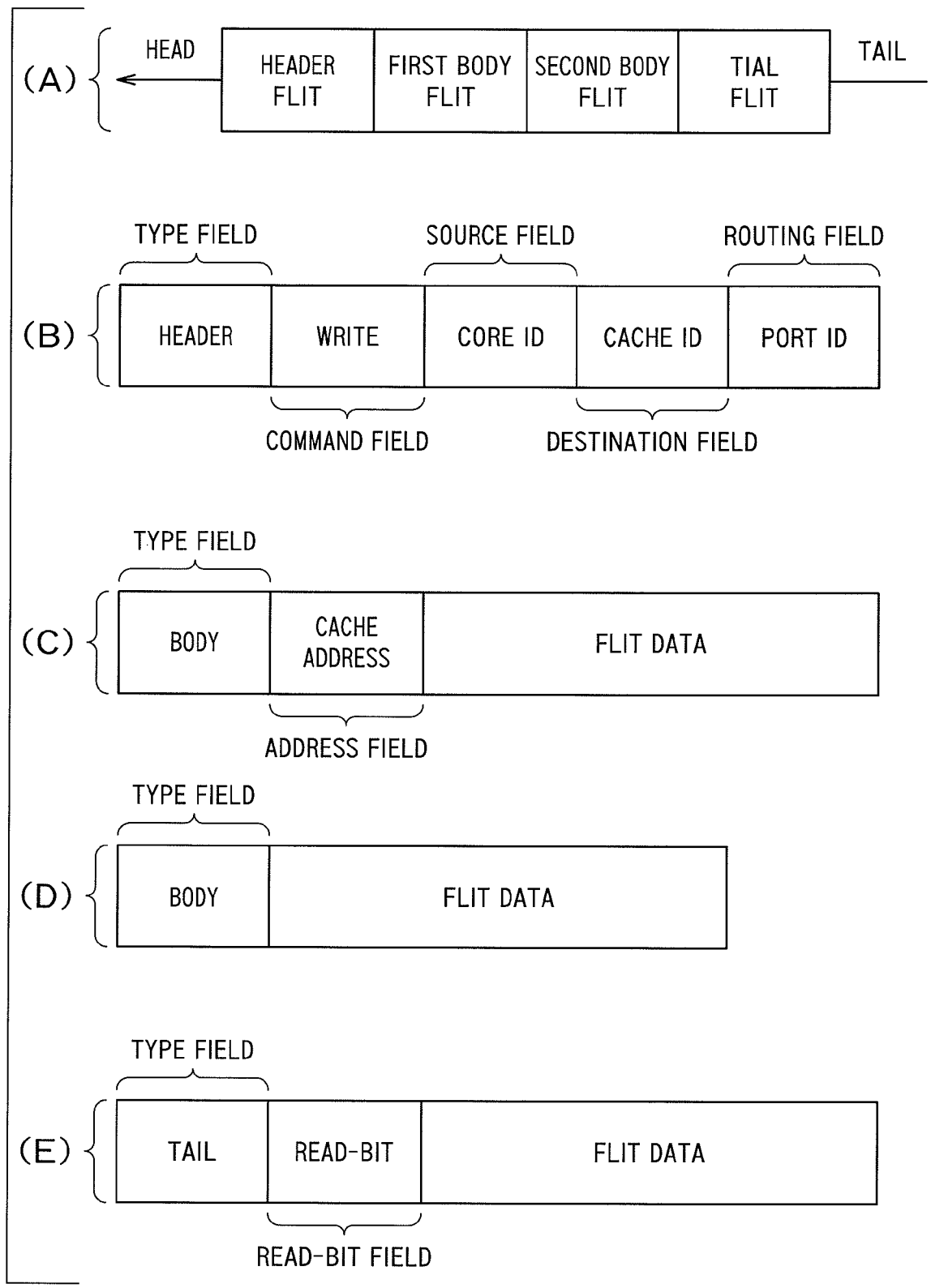
FIG. 13 is a schematic diagram illustrating a structure of a write-packet of a modification of the embodiment.
Figure 14:
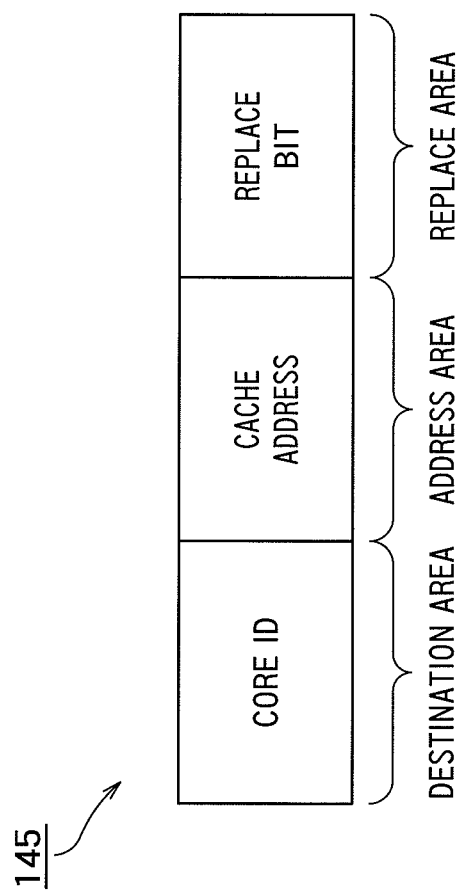
FIG. 14 is a schematic diagram illustrating the structure of the packet memory 145 of the modification.

A modification of the embodiment will be explained below. FIG. 13 is a schematic diagram illustrating a structure of a write-packet of a modification of the embodiment. FIG. 14 is a schematic diagram illustrating the structure of the packet memory 145 of the modification. The description of contents similar to those of the embodiment is omitted.

The tail flit of the write-packet includes a read-bit field in addition to the type field and the flit data. A read-bit (for example, 1 bit) is set to the read-bit field. The read-bit indicates whether the cache data that can become the response data to the read-packet issued after the write-packet is issued is outputted to the core 12 or not. The packet memory 145 includes the destination area, the address area, and the replace area, although the packet memory 145 does not include the data area.

Figure 15:
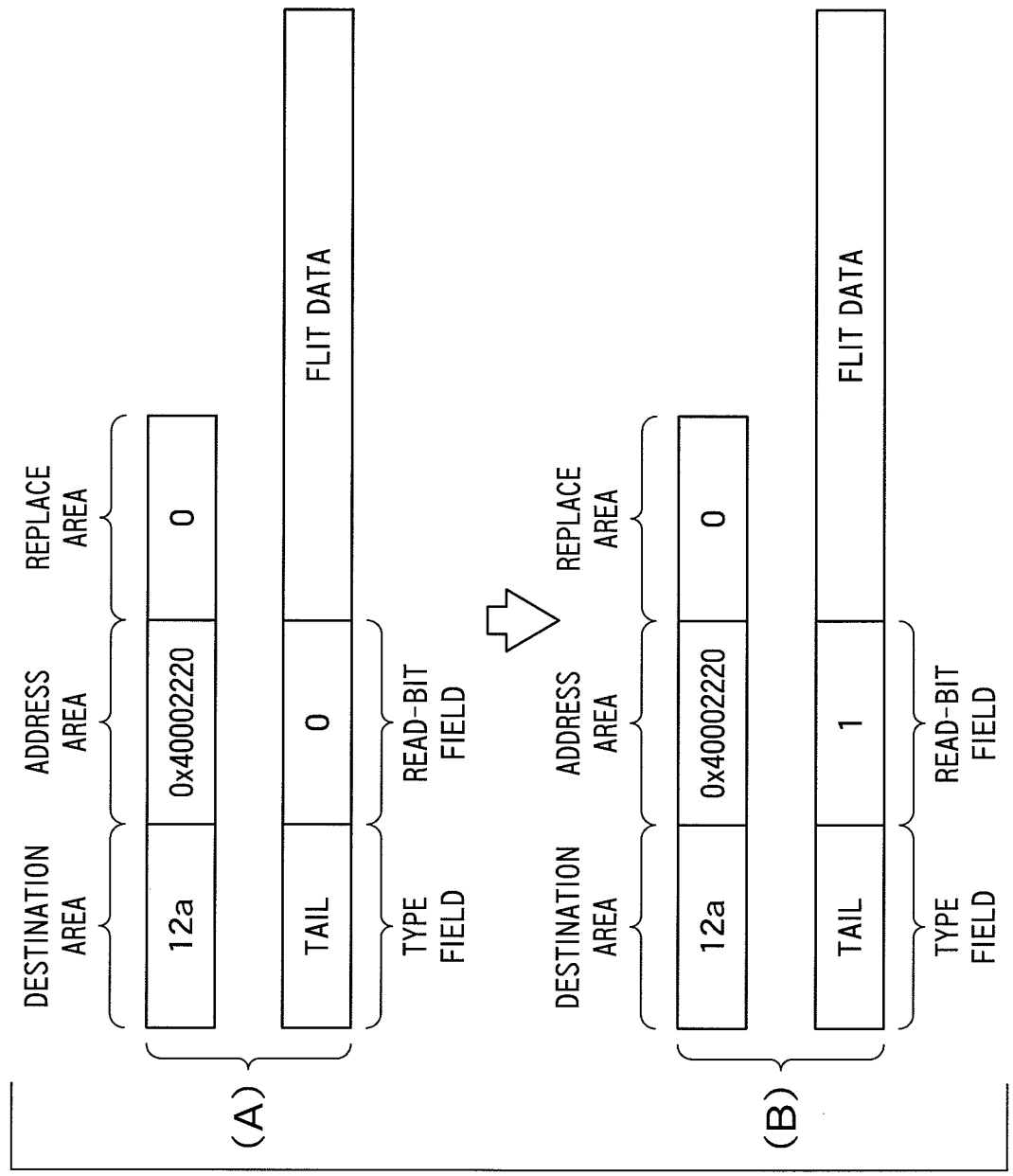
FIG. 15 is a schematic diagram illustrating information stored in the packet memory 145 and the tail flit of the write-packet in a behavior example of the many-core system of the modification.

FIG. 15 is a schematic diagram illustrating information stored in the packet memory 145 and the tail flit of the write-packet in a behavior example of the many-core system of the modification. When the core 12a issues the write-packet, the write-packet is outputted to the cache memory 16 corresponding to the cache ID after stored in the buffer 142. At this point, the core ID and the cache address are stored in the packet memory 145, and a replace bit "0" and a read-bit "0" are set ((A) in FIG. 15). As used herein, the read-bit "0" means that the router 14 does not output the read-packet to read the cache data of the write-packet in the read-packet issued after the write-packet is issued.

When the core 12a issues the read-packet to read the cache data of the write-packet, the controller 143 determines whether the same address as the read cache address stored in the buffer 142 is stored in the packet memory 145 or not. When such cache address is stored, a read-bit "1" is set ((B) in FIG. 15). The read-bit "1" indicates state in which the read-packet issued after the write-packet is issued can be outputted prior to the write-packet (that is, the read-request can overtake the write-request). Then the response packet is generated based on the write-packet stored in the buffer 145.

According to the modification of the embodiment, the write-packet includes the read-bit. Therefore, the effect similar to that of the embodiment is obtained even if the data area is not provided in the packet memory 145. As a result, a capacity of the packet memory 145 can be reduced.

At least a portion of a many-core system 10 according to the above-described embodiments may be composed of hardware or software. When at least a portion of the many-core system 10 is composed of software, a program for executing at least some functions of the many-core system 10 may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the many-core system 10 according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A router configured to manage routing of a packet transferred between a plurality of cores and at least one of cache memories to which the cores can access, the router comprising:
   an analyzer configured to determine whether the packet is a read-packet or a write-packet;
   a packet memory configured to store at least part of the write-packet issued by one of the cores; and
   a controller configured to,
      when the analyzer determines that the packet is the write-packet and the packet memory is not full, store cache data of the write-packet and a cache address in the packet memory, the cache address indicating an address in which the cache data is stored,
      when the analyzer determines that the packet is the write-packet and the packet memory is full, output the packet to a subsequent router or one of the cache memories without storing the packet in the packet memory, and
      when the analyzer determines that the packet is the read-packet and the cache address corresponding to the read-request is stored in the packet memory, output the cache data stored in the packet memory to the core issuing a read-request as a response data corresponding to the read packet.

2. The router of claim 1, wherein the controller stores unique information of the core issuing the write packet.

3. The router of claim 1, wherein the controller outputs read-packet to the cache memory or another router when the cache address is not stored in the packet memory, the cache memory or another router corresponding to the cache address in the read-packet.

4. The router of claim 1, further comprising:
   a read-input port configured to input the read-packet;
   a write-input port configured to input the write-packet;
   a read-output port configured to output the read-packet;
   a write-output port configured to output the write-packet; and
   a buffer configured to store the read-packet inputted by the read-input port and the write-packet inputted by the write-input port,
   wherein the controller stores at least part of the write-packet stored in the buffer to the packet memory when the analyzer determines that packet is the write-packet.

5. A router configured to manage routing of a packet transferred between a plurality of cores and at least one of cache memories to which the cores can access, the router comprising:
   an analyzer configured to determine whether the packet is a read-packet or a write-packet;
   a packet memory configured to store at least part of the write-packet issued by one of the cores; and
   a controller configured to store cache data of the write-packet and a cache address in the packet memory when the analyzer determines that the packet is the write-packet, the cache address indicating an address in which the cache data is stored, and output the cache data stored in the packet memory to the core issuing a read-request as a response data corresponding to the read packet when the analyzer determines that the packet is the read-packet and the cache address corresponding to the read-request is stored in the packet memory,
   wherein the controller sets a replace bit to a replace area in the packet memory, the replace bit indicating whether the cache data stored in the packet memory can be read and deleted or not.

6. The router of claim 5, wherein the controller sets the replace bit to the replace area when reading of the write-packet is ended, the replace bit permitting the cache data to be read and deleted.

7. The router of claim 6, wherein the controller sets the replace bit to the replace area when the cache data stored in the packet memory is outputted as the response data, the replace bit permitting the cache data to be read and prohibiting the cache data to be deleted.

8. The router of claim 6, wherein the controller stores unique information of the core issuing the write packet.

9. The router of claim 5, wherein the controller sets the replace bit to the replace area when the cache data stored in the packet memory is outputted as the response data, the replace bit permitting the cache data to be read and prohibiting the cache data to be deleted.

10. The router of claim 5, wherein the controller stores unique information of the core issuing the write packet.

11. A many-core system comprising:
   a plurality of cores;
   at least one of cache memories to which the cores can access;
   an analyzer configured to determine whether the packet is a read-packet or a write-packet;
   a packet memory configured to store at least part of the write-packet issued by one of the cores; and
   a controller configured to,
      when the analyzer determines that the packet is the write-packet and the packet memory is not full, store cache data of the write-packet and a cache address in the packet memory, the cache address indicating an address in which the cache data is stored,
      when the analyzer determines that the packet is the write-packet and the packet memory is full, output the packet to a subsequent router or one of the cache memories without storing the packet in the packet memory, and
      when the analyzer determines that the packet is the read-packet and the cache address corresponding to the read-request is stored in the packet memory, output the cache data stored in the packet memory to the core issuing a read-request as a response data corresponding to the read packet.

12. The system of claim 11, wherein the controller stores unique information of the core issuing the write packet.

13. The system of claim 11, wherein the controller outputs read-packet to the cache memory or another router when the cache address is not stored in the packet memory, the cache memory or another router corresponding to the cache address in the read-packet.

14. The system of claim 11, further comprising:
   a read-input port configured to input the read-packet;
   a write-input port configured to input the write-packet;
   a read-output port configured to output the read-packet;
   a write-output port configured to output the write-packet; and
   a buffer configured to store the read-packet inputted by the read-input port and the write-packet inputted by the write-input port,
   wherein the controller stores at least part of the write-packet stored in the buffer to the packet memory when the analyzer determines that packet is the write-packet.

15. A many-core system comprising:
   a plurality of cores;
   at least one of cache memories to which the cores can access;

an analyzer configured to determine whether the packet is a read-packet or a write-packet;

a packet memory configured to store at least part of the write-packet issued by one of the cores; and a controller configured to store cache data of the write-packet and a cache address in the packet memory when the analyzer determines that the packet is the write-packet, the cache address indicating an address in which the cache data is stored, and output the cache data stored in the packet memory to the core issuing a read-request as a response data corresponding to the read packet when the analyzer determines that the packet is the read-packet and the cache address corresponding to the read-request is stored in the packet memory, wherein the controller sets a replace bit to a replace area in the packet memory, the replace bit indicating whether the cache data stored in the packet memory can be read and deleted or not.

16. The system of claim 15, wherein the controller sets the replace bit to the replace area when reading of the write-packet is ended, the replace bit permitting the cache data to be read and deleted.

17. The system of claim 16, wherein the controller sets the replace bit to the replace area when the cache data stored in the packet memory is outputted as the response data, the replace bit permitting the cache data to be read and prohibiting the cache data to be deleted.

18. The system of claim 16, wherein the controller stores unique information of the core issuing the write packet.

19. The system of claim 15, wherein the controller sets the replace bit to the replace area when the cache data stored in the packet memory is outputted as the response data, the replace bit permitting the cache data to be read and prohibiting the cache data to be deleted.

20. The system of claim 15, wherein the controller stores unique information of the core issuing the write packet.

* * * * *